Aug. 27, 1946.  F. WALLER ET AL  2,406,574

GUNNERY TRAINING

Filed Oct. 17, 1941  11 Sheets-Sheet 1

INVENTORS
FRED WALLER
W. ROBERT DRESSER
BY H. MARTYN BAKER
Emery, Varney, Whittemore & Dix
ATTORNEYS

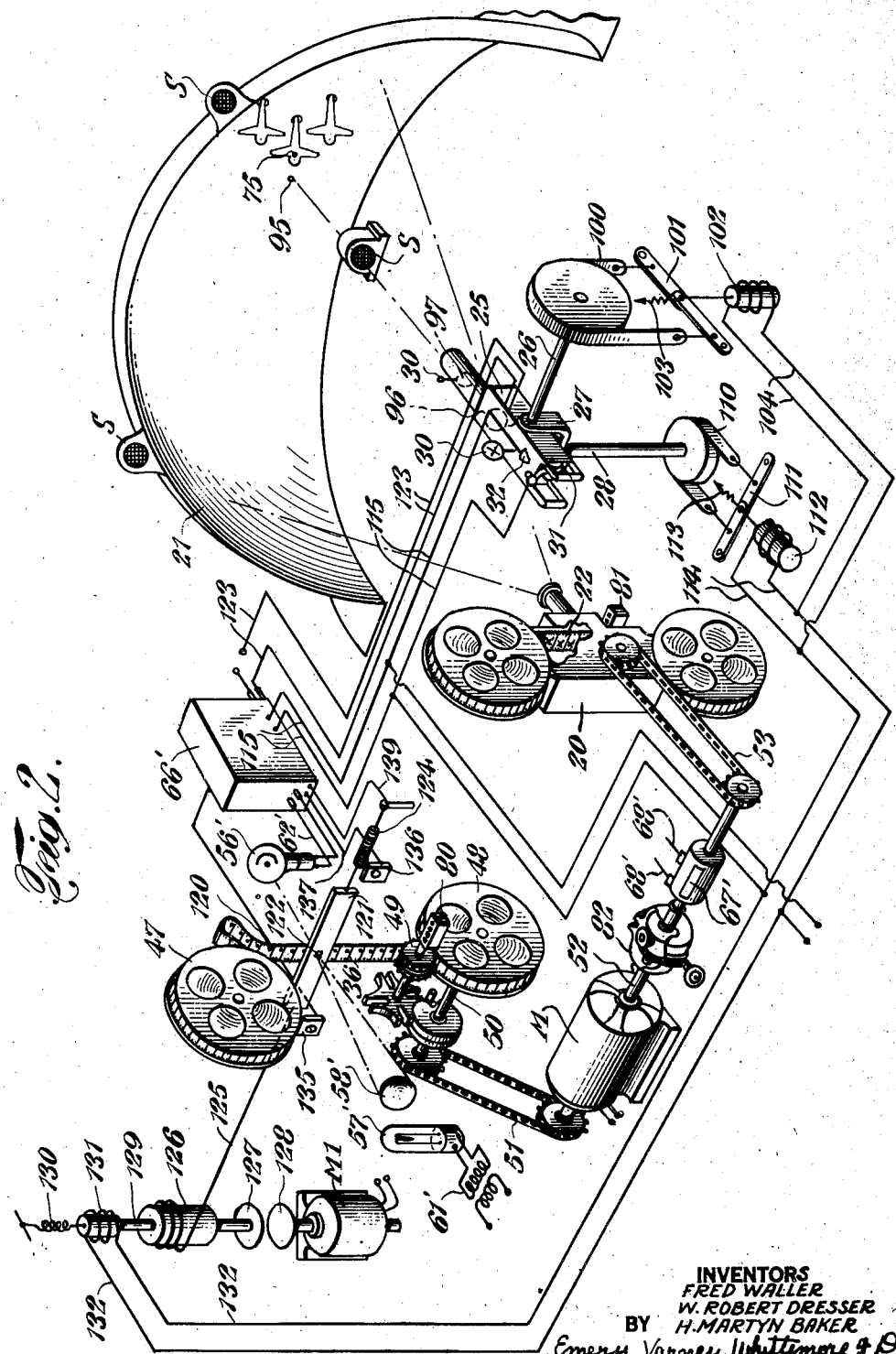

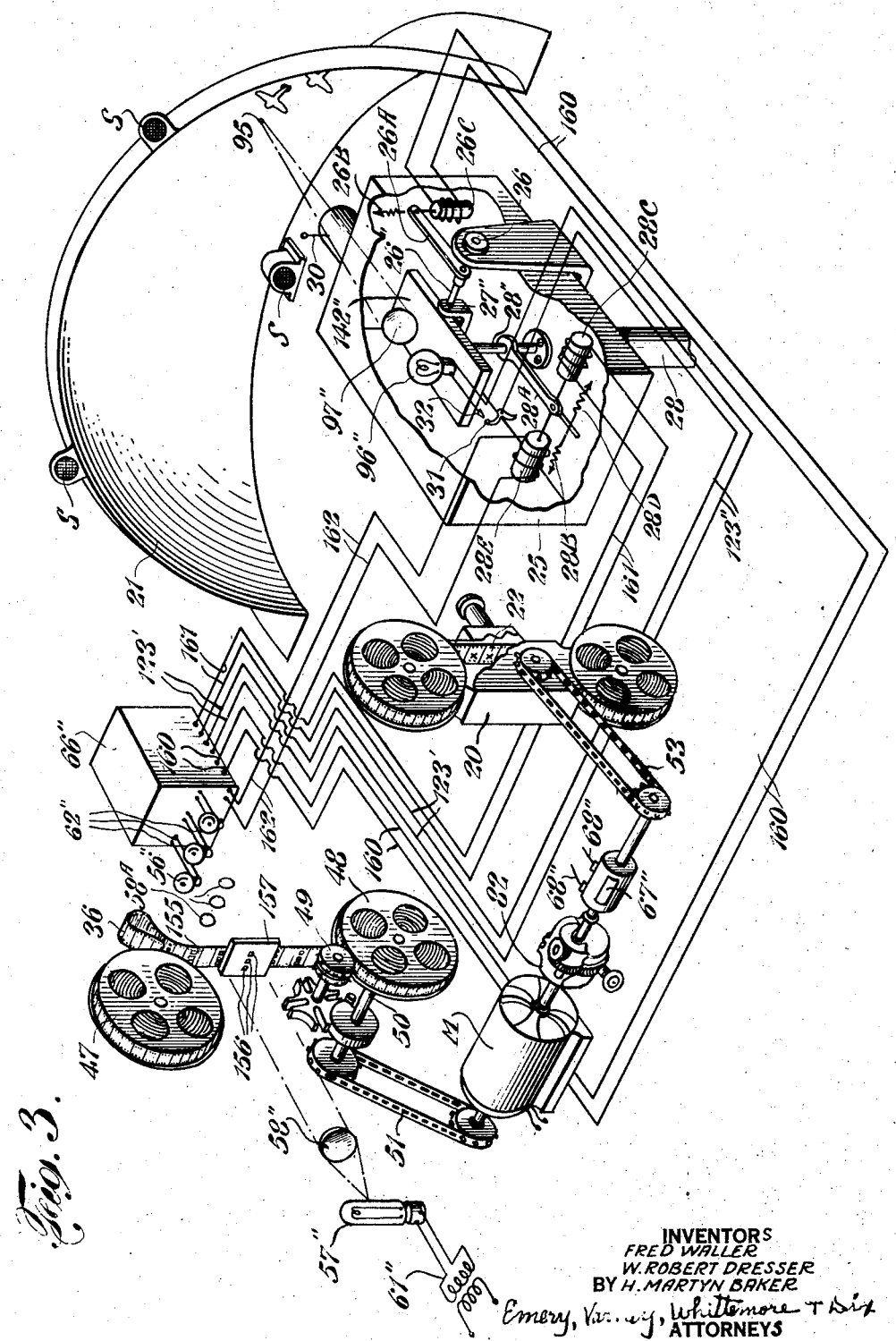

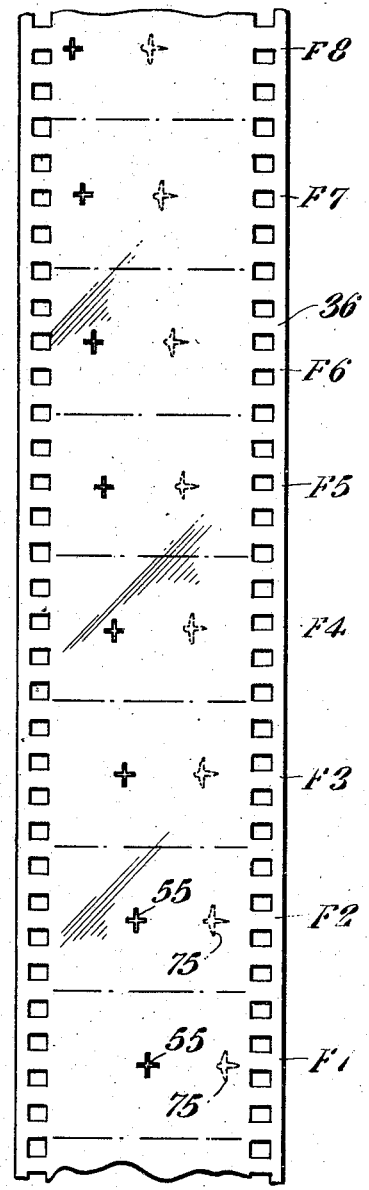
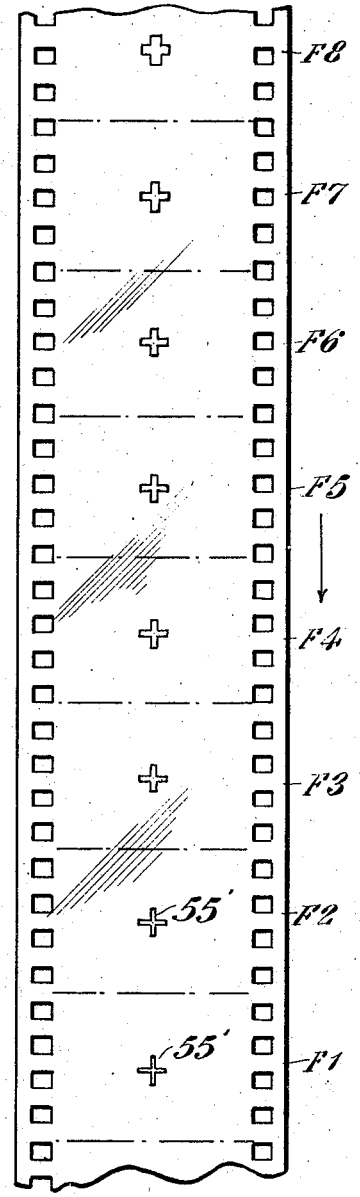

Aug. 27, 1946.    F. WALLER ET AL    2,406,574
GUNNERY TRAINING
Filed Oct. 17, 1941    11 Sheets-Sheet 5
Fig. 6.
Fig. 7.
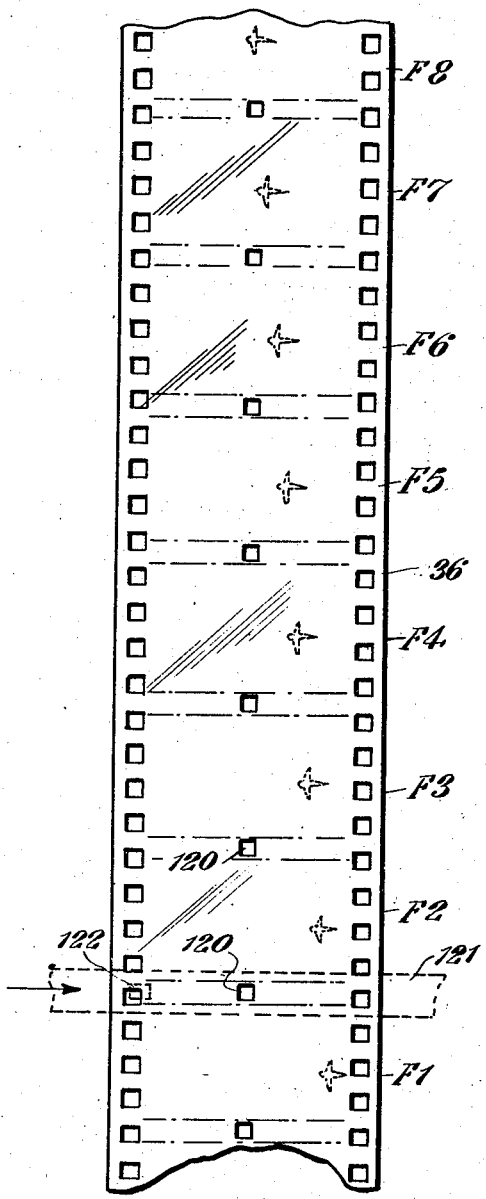
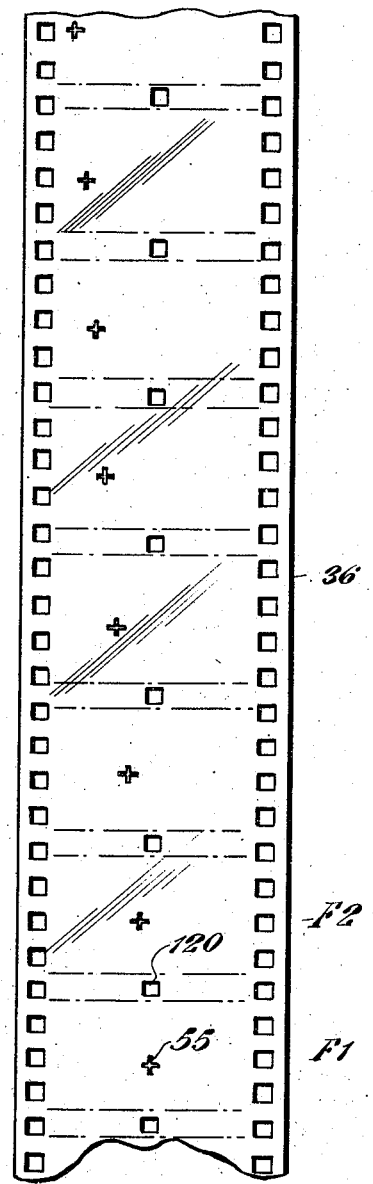
INVENTORS
FRED WALLER
W. ROBERT DRESSER
BY H. MARTYN BAKER
Emery, Varney, Whittemore & Dix
ATTORNEYS Aug. 27, 1946.　　F. WALLER ET AL　　2,406,574
GUNNERY TRAINING
Filed Oct. 17, 1941　　11 Sheets-Sheet 6
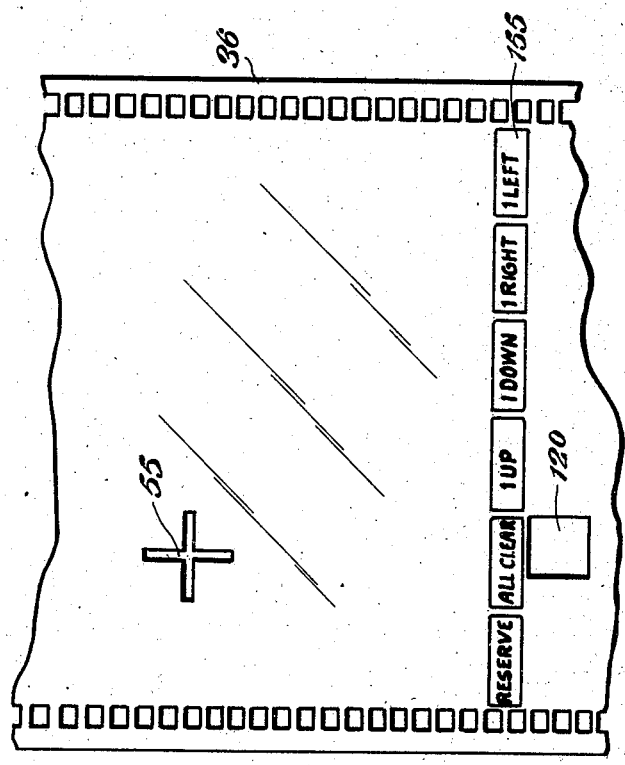
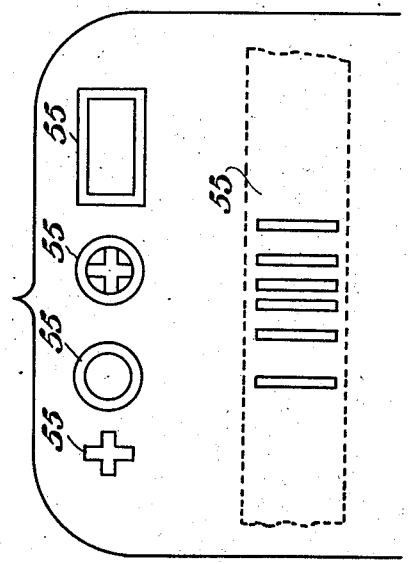
INVENTORS
FRED WALLER
W. ROBERT DRESSER
BY H. MARTYN BAKER
Emery, Varney, Whittemore & Dix
ATTORNEYS

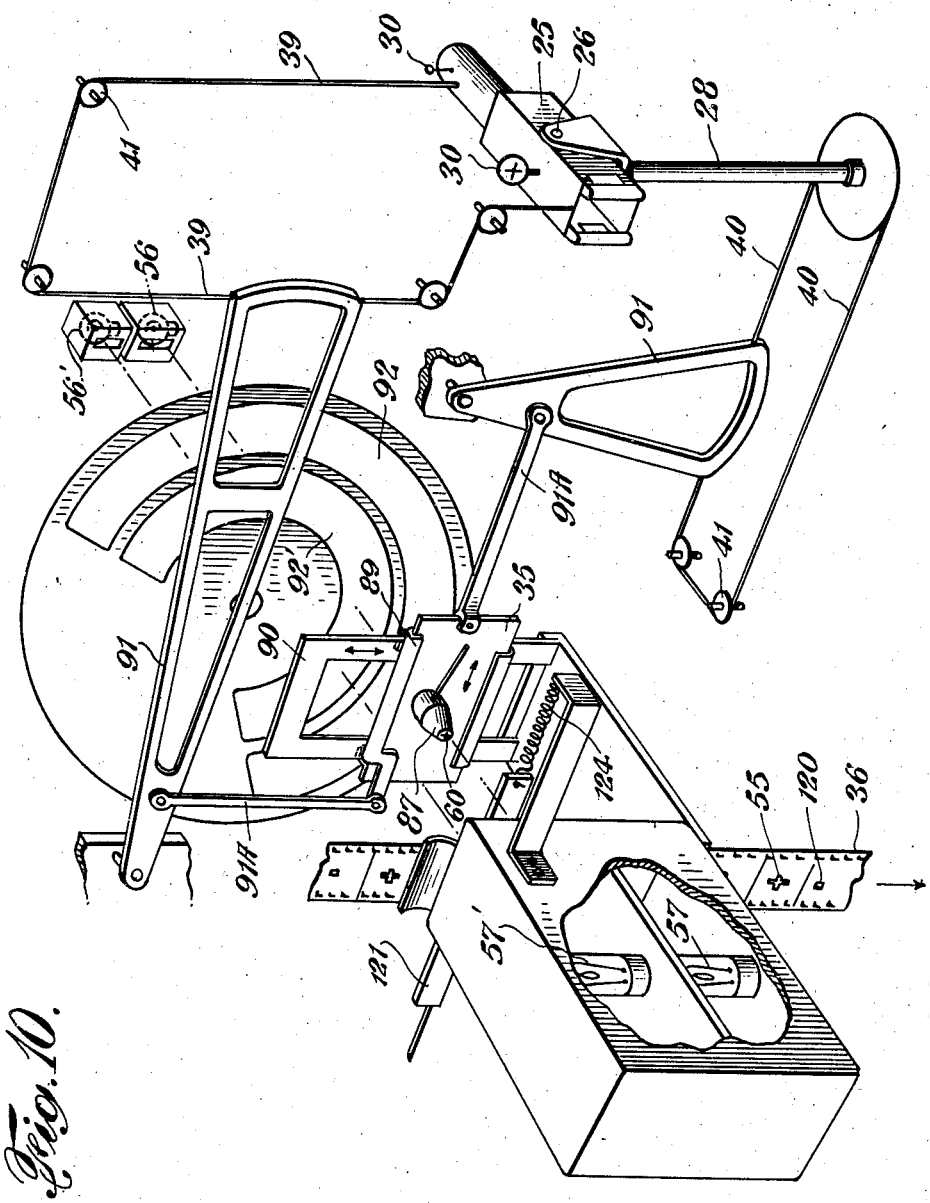

Aug. 27, 1946.     F. WALLER ET AL     2,406,574
GUNNERY TRAINING
Filed Oct. 17, 1941     11 Sheets-Sheet 8
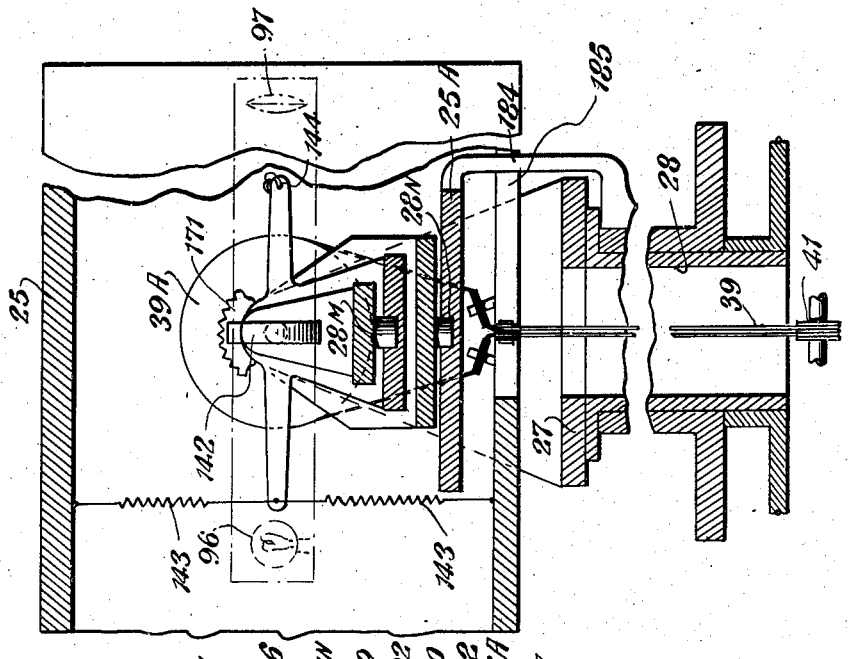
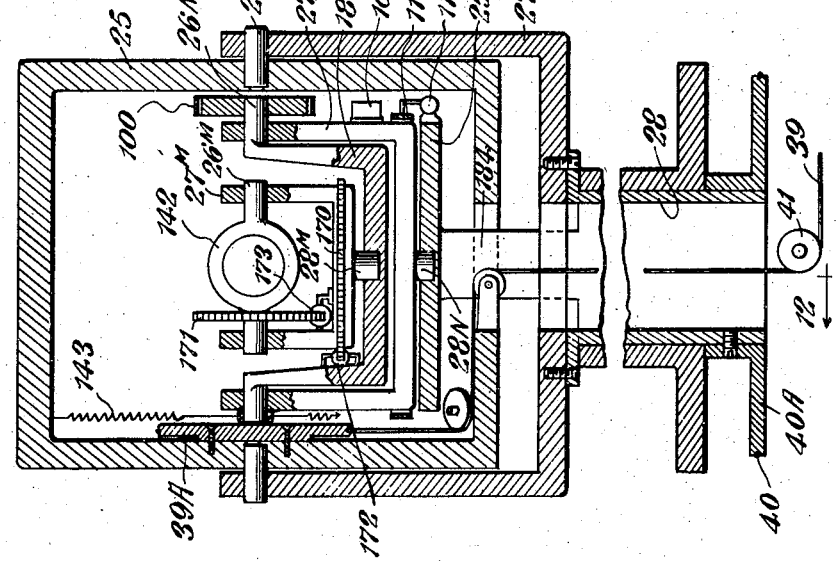
INVENTORS
FRED WALLER
W. ROBERT DRESSER
BY H. MARTYN BAKER
Emery, Varney, Whittemore & Dix
ATTORNEYS

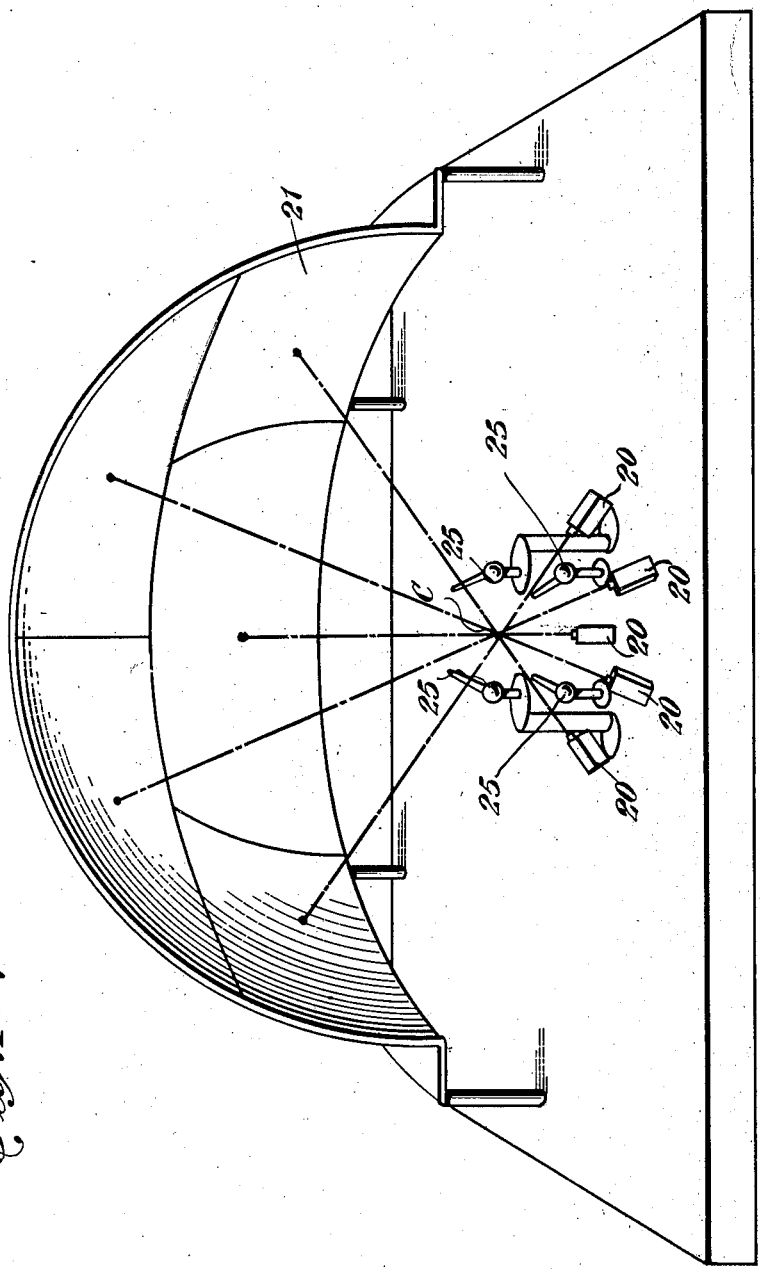

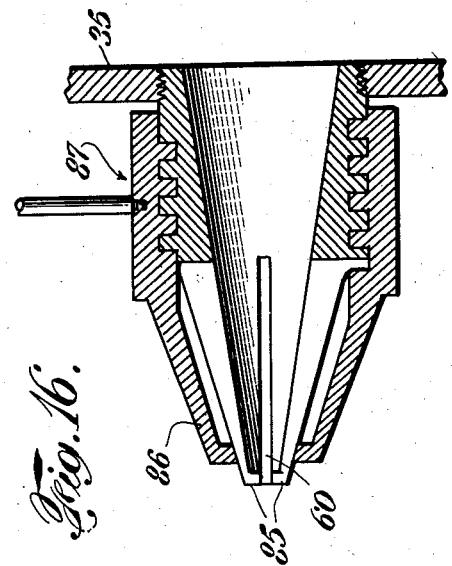
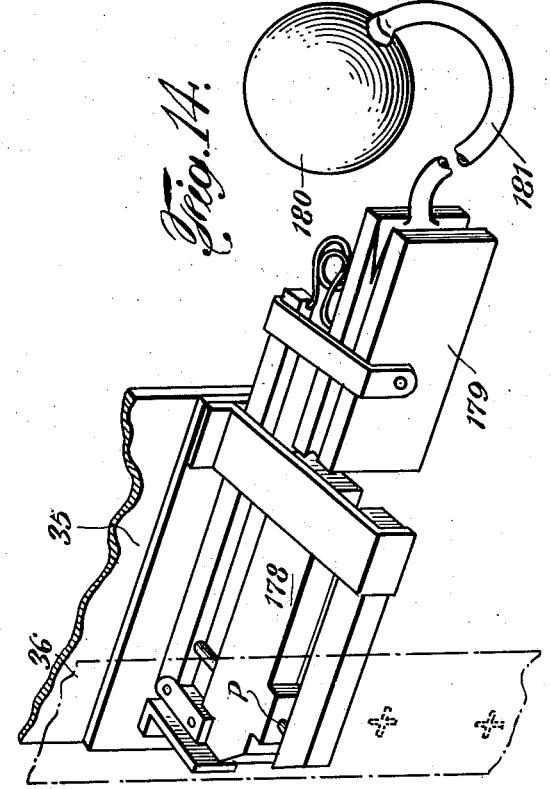
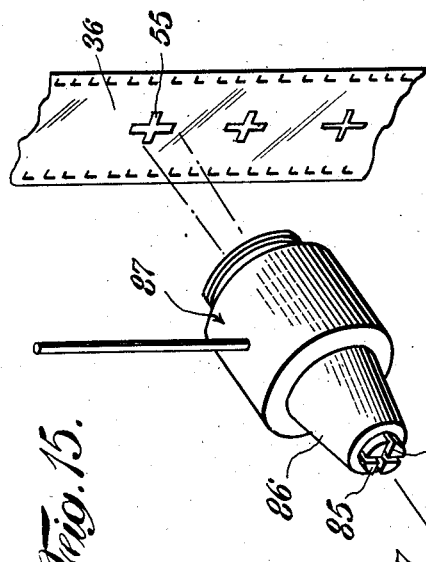
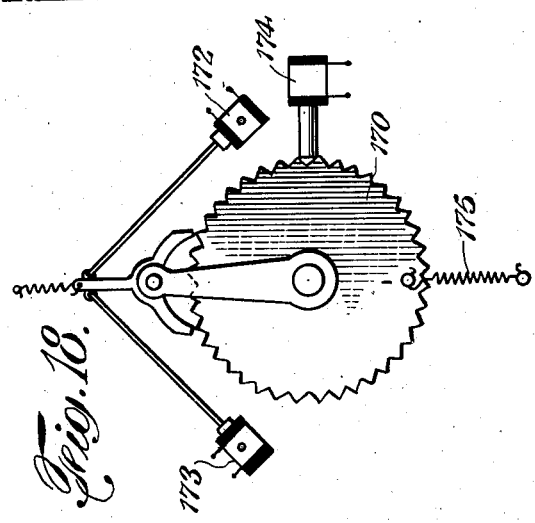
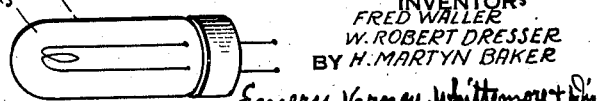

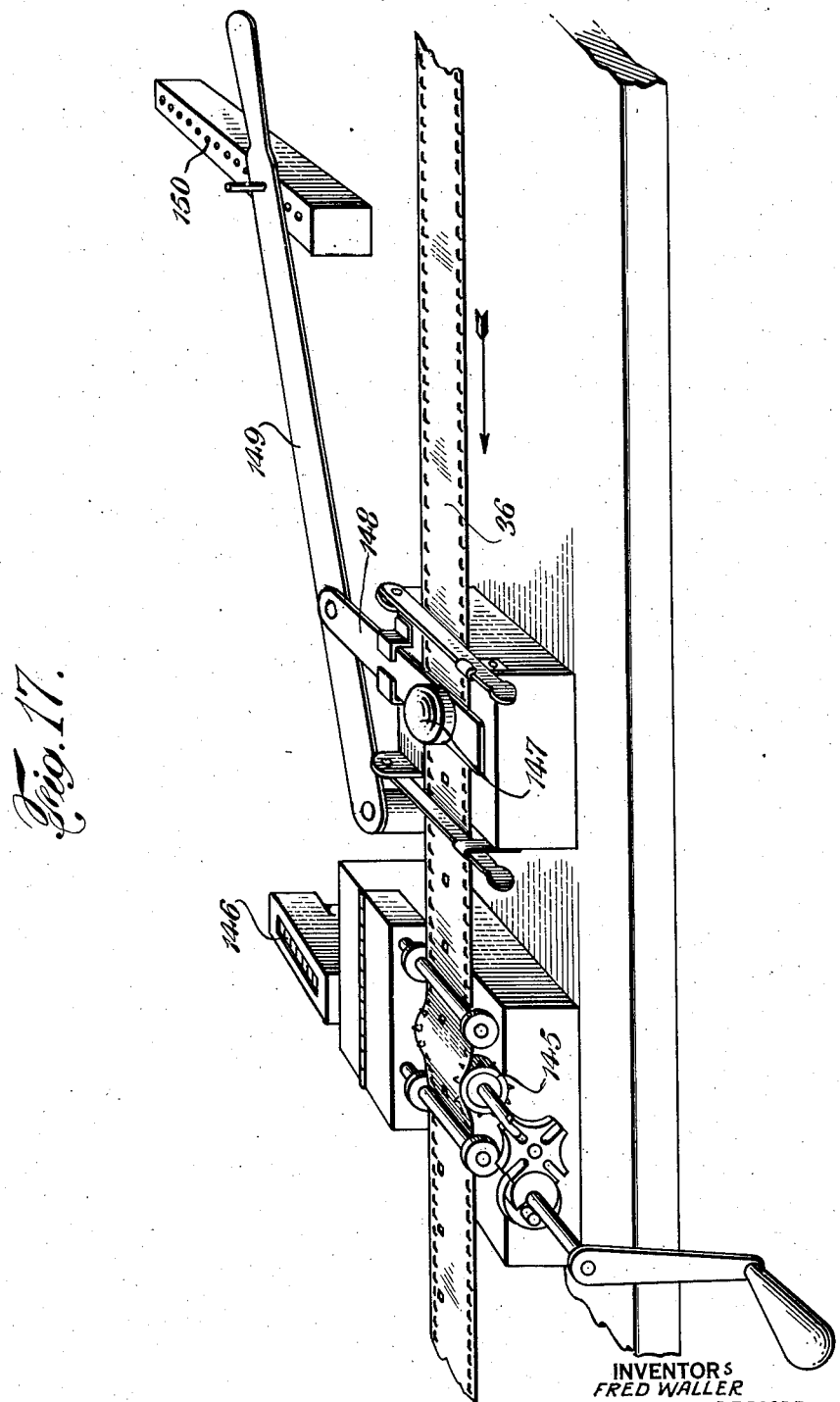

Patented Aug. 27, 1946

2,406,574

UNITED STATES PATENT OFFICE 2,406,574

GUNNERY TRAINING

Fred Waller, Huntington, N. Y., and Willis Robert Dresser, Long Hill, and Henry Martyn Baker, Essex, Conn., assignors to The Vitarama Corporation, New York, N. Y., a corporation of New York Application October 17, 1941, Serial No. 415,374

52 Claims. (Cl. 35—25)

This invention relates to gunnery training and has for an object the provision of improvements in this art.

One of the objects of the invention is to provide training apparatus which in physical appearance, setting and mode of use corresponds in the greatest possible degree to actual service equipment, environment and use.

The invention may have a variety of uses, but as an aid to a rapid comprehension of its nature and advantages it will be described in connection with the training of machine gunners for shooting airplanes and other moving targets.

At present there is practically no way to properly train an airplane gunner except in actual combat. He may shoot on a range to test his general aptitude. By this and other tests men may be selected for gunnery service, but they still need experience of actual conditions in order to acquire that instant and precise judgment of distance, speed, windage, gravitational effects, time of bullet flight and other conditions, which is so necessary for rapid and effective firing required in combat.

Practically the only attempt now made to provide service gunnery training is that of towing a sleeve or other target behind an airplane and permitting the gunner to shoot at it from another airplane. This at best is not very good practice because the lineally moving target is but a poor substitute for an airplane in combat acrobatics. Moreover, this requires the use of much expensive service equipment for training only one man at a time, and in addition there is danger of injury to the personnel or equipment, or to life and objects on the ground.

According to the present invention, motion pictures are taken from the viewpoint of a prospective gunner, as of combat airplanes from another airplane. These pictures are subsequently projected from the same relative position upon a screen, and a gunnery trainee or student is placed with a dummy gun as near as conveniently possible to the projection axis to aim and fire at selected objects in the pictures on the screen. There may be several guns for as many students grouped closely around the center of projection. No actual projectiles need be fired at the screen. Instead, control apparatus is operated in accordance with the picture projection and gun position at the time of firing, which determines whether a hit or miss is made and provides intelligence thereof. This control apparatus is preconditioned to account for the position of the target in space, its distance from the gun, the time of flight of an imaginary projectile from the gun to a point of "burst" in the plane of the target, and other factors, to provide a very accurate control condition relative to or against which the gunner operates. If he matches these control conditions, the apparatus will register his shot as a hit.

The indication of a hit may be given in many different ways. The necessary impulse having been provided, a great variety of indications may be possible, as for example a bell, a light, a touch, a record mark, or the like.

The apparatus may also be used for purely instructive purposes as, for example, to project a spot of light together with an image of the target on the screen to indicate where the burst should be, or to indicate the correct point of aim to make a hit, the trainee following this in his sights or later attempting to duplicate the situation.

The general outlines of the invention have been noted and reference has been made to motion pictures taken and projected from a gunner's viewpoint. A single film will serve the invention; but for greater realism and more perfect training a number of film records are made at different angles from the gunner's position. When these films are projected in the same relationship upon a concave curved screen, there is provided a realistic three-dimensional effect. And when to this there is added sound (which also may be recorded from the gunner's position) from a number of sources distributed over the screen, the approach to realism is very striking. Such a system of projection with sound is disclosed in the co-pending application of Fred Waller and Ralph Walker, Serial No. 163,712, filed September 14, 1937, now Patent No. 2,280,206, April 21, 1942.

When this curved (commonly spherical) screen has a radius of about twenty feet or more, it provides a setting which substantially satisfies the conditions for correct visual judgment of distance because, for the average person, the judgment of distance and perspective beyond about twenty feet is not due to the interpupillary distance of the eyes, but is due to peripheral vision, that is, what the eye sees outside its central area of sharp focus, and also to relative movement perspective, and to color or atmospheric perspective. When a colored three-dimensional motion picture is projected on a screen of this size together with a three-dimensional reproduction of the sound record made at the gunner's position, or its approximation, practically all the elements of realism are faithfully reproduced.

When a trainee is placed near the projection center of such an environment and fires at a moving target, say a moving airplane with its motors operating and its guns firing blanks, there is provided an opportunity to observe not only his judgment but also something of his psychological reaction under conditions which almost duplicate actual service conditions.

To this there may be added mechanism for reproducing the sound of firing the type of gun which is represented by the dummy gun; and the dummy gun may be vibrated when the trigger is pulled, to simulate its normal vibration in use. Also the trainee's mount may be similar to that in service and arranged to have movements which simulate to some extent those of an airplane in combat; and elements of surprise or shock may be provided to obtain the trainee's reactions. These effects may be varied to suit different service requirements or the instructor's fancy. They are mentioned to illustrate how the invention can be carried forward to provide test conditions which are realistic and which almost wholly duplicate actual service conditions.

The invention provides for obtaining a highly accurate test of the trainee's gunnery ability and a great deal of precise gunnery practice for a large number of students at a relatively small expense, and this under conditions where immediate indications of results are given to the trainee or his instructor. This is in contrast to "towed sleeve gunnery," mentioned above, where the sleeve can be examined for hits only after the flight is over, and to "camera gunnery" where the record must be developed, during which time the student has forgotten many of the conditions under which the record was made. Moreover, camera gunnery does not provide for time of flight, windage, gravity, airplane speeds and the like. To merely sight directly on a moving target is to miss it completely under most service conditions, just as is true in skeet, trapshooting, bird shooting or the like. Incidentally, these sports may also be effectively taught or be used as a source of amusement according to the present invention.

Having seen how a plurality of film bands and associated effects may be employed to obtain realism of environment, we may, for simplicity, return to the consideration of a single film band. Say a target airplane is seen approaching in a certain sequence of pictures in this band. A projectile, more commonly a plurality of projectiles, as when a machine gun is used, is fired with sufficient "lead" to arrive at a given point in space, taking account of time of flight, etc., when a given vulnerable part of the airplane arrives at the same point, and a hit is made. The airplane image at that time is located at a given position or coordinate point on a single picture or frame of the film band. It also occupies a corresponding coordinate position on the projected picture area on the screen. If a light spot were left on the screen where the burst was placed, and if a small pin hole, cross or other transparent area were made in the frame where the hit was to be made on the airplane, then when the airplane reached the same place, the hole or "hit" spot would exactly coincide with the burst spot. For the moment gravity drop, which would require the aim to be vertically displaced relative to the hit spot, and windage, which would require the aim to be horizontally displaced relative to the target, are neglected.

Basically, therefore, the pin hole, cross, or other indicia hereinafter referred to, might be provided directly in each frame of the actual picture film band. Preferably, however, a separate band (or bands), which will be referred to as a control band, is used instead, for a number of reasons.

For one thing, the picture film may have many natural light spots which might be confused with the "hit" spot, hence it is more dependable to use a control film band which is wholly opaque except for the purposely made control spots.

Further, if the hit spot were made in the picture band it would be projected on the screen and this would confuse or unduly guide the trainee. For certain instruction purposes it may be placed in the picture band, as explained hereinafter.

Further, it is desired to utilize the hole or spot in a frame to control certain auxiliary apparatus and the full frame of picture film is required for the projection beam at the moment of projection.

Further, it is desired to compute the distance from the gun to the target—which may be done by known photographic triangulation methods which need not be described here—and set against it the time of flight of the projectile—taken from ballistic tables of the particular gun and ammunition, and other pertinent data—in order to properly place the spot on the band. It can be seen that it would not fall at the spot on the picture frame where the hit will occur, because of the time of flight and other factors. Only if the target were located at zero distance from the muzzle of the gun would the aim and hit spots coincide on the picture film. It is desired to take account of the time of flight in placing the aim spot on the control band. This has a further function which will be explained.

Further, it is desired to give immediate intelligence or indication of a hit, and this cannot be done conveniently with the picture film because the target has not arrived at the point of the burst at this time. It is preferred to place this indication on a separate control band which may be, in effect, displaced longitudinally relative to the picture band to take care of this situation.

Moreover, when a plurality of picture film bands are employed to project a mosaic of separate areas which form a composite picture on a large or spherical screen, the target may not remain on a single band while it is in the range of the gun. When a separate control band is employed it may be proportioned to the total area of the screen or of all film bands or to the coordinate range of movement of the dummy gun, and the indicia provided in suitable proportionate relationship on the control band to the locational coordinates of the target in the picture.

In some instances it may be desired to form the control band of metal or other durable material, though a sensitized band is still contemplated when prints are desired and where the weakening effect of holes can be avoided by providing transparent spots. Also it may be desirable to use longer or wider frames to permit of greater distances and accuracy and to permit more equipment to be mounted about the control frame zone. For example, the frame of the control band may equal two picture frames in length. Or it may be desired to provide conventionalized indicia of the target positions on the control band.

For usual service requirements it will be sufficient to record the hit or project an image of the burst spot on the screen, or both, when the target arrives at its given position. For certain service it may be desirable to represent the burst on the screen as soon as the gun is fired, and to preserve the spots on the screen a certain length of time, as by using a phosphorescent coating on the screen. The last bursts will appear more brilliantly and fade or decay progressively so as to gradually disappear.

For this type of spot projection and also for the delayed spot projection it may be desirable to provide correction for deviations of the projectile from straight line flight to take account of windage, gravity drop, parallax and other variable factors. Preferably this is done by regulating the position of the spot projector from one or more control bands which have been prepared to compensate for these displacements. One control band may be used for all purposes but the last mentioned factors may be accommodated by one or more control bands apart from the control band which registers hits and projects the delayed burst spot after the correct time of flight. This avoids undue complications for beginners, yet requires advanced students to take into account more of the factors of actual service. In this way special problems may be taught. These factors may or may not be taken into account in preparing the control band with aim spots for indicating hits. If they are, the sights may be required to be aimed higher or lower to compensate for gravity drop and other factors which affect elevation, or with more or less lead than that required for time of flight of the projectile to compensate for windage, direction of approach, speed of gunner's airplane, and other factors which affect train.

The enumerated and other objects, features and advantages of the invention will appear from the following description of certain embodiments of the invention, reference being made to the accompanying drawings, wherein:

Fig. 2 is a schematic view (which is to be regarded as combined with Fig. 1) of apparatus for furnishing an indication of hits at the time they are made, allowance for time of flight having been made;

Fig. 3 is a schematic view (which is to be regarded as combined with Figs. 1 and 2) of apparatus for automatically adjusting the delayed hit or burst spot to take account of windage, gravity drop, advancing or receding target speeds, parallax and the like;

Figure 1:
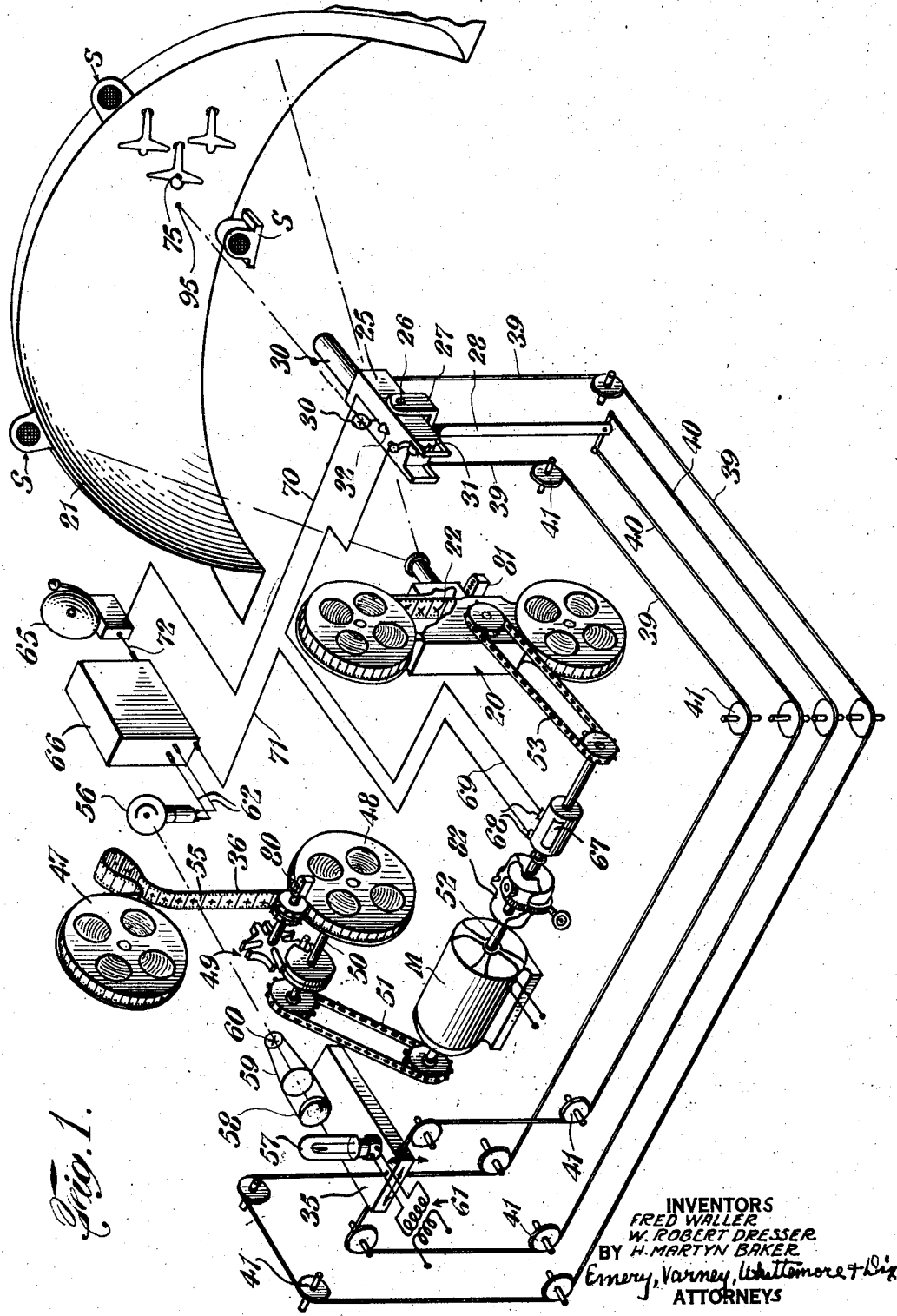
Fig. 1 is a schematic view of apparatus for furnishing immediate intelligence of correct aim or hits.

Fig. 4 is a view of a length of control film band used in the apparatus shown in Fig. 1, the image of the target airplane being superimposed in dotted lines to show what its relationship to the aim punch mark or cross would be if the punch mark were made in the projection film band (here assuming that one and not several film bands is used for projection, that a projection speed of sixteen frames per second is used, and that the target airplane is moving parallel to the focal plane at a distance of one-half second time of flight);

Fig. 5 is a similar view with apertures of variable size, it here being assumed that the airplane is moving straight toward the gunner;

Fig. 6 is a view of a length of control film band used in the apparatus shown in Fig. 2, the image of the target airplane again being superimposed in dotted lines and the conditions being the same as in Fig. 2;

Fig. 7 is a view of a length of control band used when the functions of the apparatus of Figs. 1 and 2 are combined, the same being a composite of the bands shown in Figs. 4 and 6;

Fig. 8 is a view showing several forms of aim registering apertures which may be advantageously employed;

Fig. 9 is a view of one unit length or frame of control band when the functions of the apparatus of Figs. 1, 2 and 3 are combined;

Fig. 10 is an isometric view of the actual apparatus adjacent the control band of Fig. 7;

Fig. 11 is a vertical sectional view of apparatus for projecting the delayed hit spot when the gun itself is left free for continuous aiming movement;

Fig. 12 is a vertical section taken approximately on the line 12—12 of Fig. 11;

Fig. 13 is a front perspective view showing an exemplary arrangement when five projectors, a spherical screen and four dummy guns are used;

Fig. 14 is an isometric view of part of the apparatus of Fig. 10 when a device for punching crossmarks in the film is substituted for part of the indicating apparatus;

Fig. 15 is a perspective view of apparatus for regulating aim accuracy as shown in Fig. 10 or for photographically making crosses of variable size as shown in Fig. 5;

Fig. 16 is a longitudinal section through a part of Fig. 15;

Fig. 17 is a perspective view of apparatus for making the lag apertures shown in Fig. 4; and Fig. 18 is a view showing control apparatus operated by the equipment shown in Fig. 3 and the third zone of the control band shown in Fig. 9.

Referring first to Fig. 1, a projector 20 is properly associated with a screen 21 to project thereon a series of pictures from a picture film band 22. For a concave screen of double curvature, such as the spherical screen illustrated, a plurality of projectors may be used, as illustrated in Fig. 13, and as explained in the patent referred to above. Preferably the projectors are arranged behind the geometric center C (Fig. 13) and have their optical axes located on radii through the center C. The pictures are taken by cameras arranged in approximately the same way at the gunner's position, preferably in actual mock combat conditions. In Fig. 13 five projectors are shown but the number may be varied.

All of the projectors are run in synchronism and the film bands are started and run together just as the pictures were taken by synchronized cameras. Perfect synchronization may be realized in many different ways, mechanical drive and connections being employed in the apparatus used; but it is not necessary to explain the well-known practice of drive synchronization here.

A dummy gun 25 is placed as near the center C as conveniently possible. There may be a number of these guns, as shown in Fig. 13. In practice the dummy guns may be made to resemble actual equipment in appearance and feel, but any desired departures may be made to properly dispose parts needed to satisfy the present invention.

Each dummy gun 25 is mounted to move in elevation in vertical planes upon shafts 26 having a horizontal axis. The shafts 26 are mounted in a support 27, which includes a vertical shaft 28, to permit the gun to move in train in horizontal planes about a vertical axis.

The gun, thus mounted, has coordinate movement, which may be limited in any suitable manner to confine its range to the area of the screen or any desired portion thereof. The gun is provided with sights 30 of any suitable type to permit the gunner to aim at the proper point relative to the target. A trigger 31 may be employed to control a switch 32 to initiate the action of the control mechanism. Closing the trigger switch is referred to as firing the gun.

A number of sound reproducing devices S are provided at various places about the screen to reproduce sounds in imitation of their positional and volume occurrence as registered in directional sound recording devices at the gunner's position or, it may be, artificial sounds which are appropriately prepared. Several synchronized phonographs, sound tracks on several films, several sound tracks on a single phonograph record, several sound tracks on a separate sound film band of a synchronized projector, an arbitrary selected sound of any type, or any other desired sound accompaniment may be provided by known practices.

The coordinate movements of the gun in elevation and train are transmitted by suitable connections to a control mount or support 35 which has corresponding coordinate movements. Whereas the amplitude of movement of the gun sights may be enough to cover the area on the screen, the amplitude of the mount 35 or such motion receiving means as may be provided is limited to the size of a frame or control indicia zone of the control band 36 which at any given time is stopped in front of the mount. As stated, this band 36 may be the picture film band, or a band of the same or a different size or character which is run in synchronism and step with the picture film band or bands, or an optical enlargement of any portion of any of these bands.

Any desired mechanism may be employed for transmitting the coordinate movement of the gun to the mount 35. As illustrated, a pair of equalized cords, cables, bands or chains 39 transmits the movement in elevation and a similar pair of members 40 transmits the movement in train. Changes of direction are accommodated by pulleys 41 or the equivalent.

In Fig. 1 it is merely indicated by arrows thereon that the mount 35 has coordinate movement, but in Fig. 10 the actual mounting on coordinate slides is shown and will be explained later.

The control band 36 is carried by reels 47, 48 and is fed downward by the intermittent drive mechanism 49 powered by a Geneva shaft 50 from a motor M through a sprocket chain 51. The motor shaft 52, through a sprocket chain 53, drives the mechanism of the projector 20. By this or equivalent mechanism, drive synchronism between the picture film band 22 and the control band 36 is accurately maintained at all times.

Means are provided for furnishing an immediate indication of a hit if made. As stated, the opaque control band 36 is provided with light apertures 55, here formed in the shape of a cross. These apertures occupy a definite coordinate position for each frame of the band which is halted at the control gate. A light beam is passed through this aperture to reach a light sensitive element such as a photo-electric cell 56 in order to initiate the indication of a hit or correct aim.

The light beam may be produced by a lamp 57, a collimating lens 58 and a conical mask 59 having a similar cross-shaped aperture 60 which is positioned very close to the control band. The lamp, lens and mask may all be mounted on the movable control mount or support 35, and, if desired, the light sensitive element or cell 56 may also be mounted thereon. However, as shown in Fig. 10, it may be satisfactory to mount the element carrying the aperture 60 alone on the movable support, the projected beam and light receptive cell having enough latitude to cover the movement of the aperture. The energizing connections 61 of the lamp and the leads 62 from the cell 56, if mounted on the support, will be of such a nature as to furnish no resistance to its free movement.

It will now be clear that when the conical mask has been properly positioned by the coordinate movements of the support 35 due to movements of the gun 25, the aperture 60 in the mask will coincide with the aperture 55 in the frame which is halted in front of it and the light beam will reach the cell 56 to cause the indication of a hit or correct aim to be registered. This may be evidenced by a bell 65 through a control box 66.

In order to guard against giving an indication while the control band 36 is moving, any suitable interrupting means may be provided, such as a light shutter, switch, or the like. In Fig. 1 a switch is shown for simplicity, this here comprising a rotating contact bar 67, fast on an insulating ring on the motor shaft 52, which is adapted to connect a pair of contacts 68 to complete the "ready" circuit of the cell 56. The trigger switch 32 is held closed for the instant necessary to furnish the indication. It is placed in circuit with one of the contacts 68 through a conductor lead 69, and with the bell 65 through a lead 70. A lead 71 connects the other contact 68 with the control box 66, and a lead 72 connects the bell with the control box.

Inasmuch as the aperture cross 55 in the control band provides an immediate indication of a hit when the gun sights 30 have been aimed at a point or burst spot in space which will be reached by the projectile and the target after the time of flight, it will be seen that if the cross were actually placed in the projection picture film band it would not coincide with the image of the target on that frame. It will be where the target is shown on a later frame—later by the time of flight of the bullet. Fig. 4 illustrates this situation. Here the target 75, shown in dotted lines, reaches the position of the cross eight frames after the shot was fired. This will be noted by following the vertical coordinate of the aperture cross 55 in the lower frame F1 upward to the eighth frame F8. The control band moves downward as it does in the illustrated apparatus, as shown by the arrow alongside. The plane or target, of course, has moved forward an equal amount by this time, it having for simplicity been assumed to move parallel to the picture plane and to have remained at a distance of ½ second away. The distance of 8/16 or ½ second time of flight is known and the common photographic rate of 16 frames per second is assumed. Obviously, the usual projection rate of 24 frames per second may be employed.

The hit or aim spots or light aperture crosses are placed in the control band after the picture film is made, using distances as determined by photographic triangulation (and known airplane speeds as assistance in some cases) and time of flight as determined by ballistic tables and other available data.

A simple and convenient method of placing the hit or aim crosses is to assume that a hit has been made and then in theory to move the target back on its path and to move the projectile back into the gun until the time of flight period is consumed. Having determined the time of flight, this could readily be done on the picture film by projecting a hit cross beam exactly on the target, holding it in this position, moving the picture film backward the number of frames it moved during this time, and then punching a hole in the frame which then appeared. This is the plan employed for punching, except that when a control film band is employed to take the hit crosses, the picture film is kept stationary and the control film band is moved backward the required number of frames and then punched. When the control band is moved forward again to a starting point which is even with the starting point of the picture film, as is done for projection, it can be seen that the hit crosses will have the proper position and lead to indicate hits or correct aim as soon as the trigger is pulled.

This procedure is followed for each frame of any sequence of pictures or frames in which the target is in or near the range of the gun or vision, the picture film being moved one frame at a time and each frame of the control band being correspondingly set by reference to a prepared tabulation, and marked with the hit crosses. Frame counters may be associated respectively with the moving means of the two bands to show their relative positions from matching zero starting positions at all times, a connecting drive with a clutch or a differential coupling being employed to keep them in step. Such counters are indicated in Fig. 1 at 80 and 81 and a differential by the numeral 82. If desired, a counter may be provided on the differential to indicate directly the displacement in number of frames between the two bands.

This presumes that the aim registering indicia are located on crossing coordinates l!ke the target, and that the projection apparatus may be used for preparing the control band. And this may be done, as shown in Fig. 10, where the light beam projection equipment on the movable support 35 may be used to produce a photographic exposure on sensitized film or where, as shown in Fig. 14, a film punching device P is substituted for the beam control equipment. When a picture frame is projected to throw the target image on the screen (heat insulating shutters being provided to prevent injury to the film) and the gun is sighted on the target, the beam or punch is in the position which the aperture 60 will occupy in projection if the aim is correct, and the band may be provided with the hit or aim registering cross 55 in exactly the right position. The control band will, of course, have been properly positioned relative to the film band for providing each frame with a hit cross at the proper lead in accordance with the tabulation of computations which has been prepared for each frame of this particular sequence.

If the target is approaching and the time of flight decreases, say from 8/16 to 7/16 second, one frame will be marked like the one preceding it to maintain proper coordination. If the target is receding and the time of flight increases, say from 8/16 to 9/16 second, and two aperture crosses are figured for a single frame, they will not be so placed; instead, only one aperture cross will be made.

The use of the apparatus shown in Fig. 1 will be readily understood. The gunner, by his sights 30, leads the target, say the juncture of wing and fuselage of the central airplane indicated by a dot 75 on the airplane image in Fig. 1, by the correct distance required by the time of flight and pulls the trigger 31 to close the switch 32, and a hit is registered immediately. He may keep the sights aimed and the trigger switch closed continuously and he will register a hit and ring the bell 65 for every frame where his aim has been correct. This represents sustained fire or what is known as "hose firing."

If the rear sight 30 is a lamp and the front sight is a collimating lens, a sharp beam of light may be directed on the screen as the sight spot. This may be the regular sighting arrangement for an individual gun and each of several guns may have a different colored light spot. The instructor may operate switches to throw a beam whenever he desires to determine where the gunner is aiming. It is particularly useful for an instructor to have such an aim spot light available when he wishes to stop the rapid projection and illustrate the correct aim, frame by frame. This he may readily do by moving the gun, with the trigger and commutator switches closed, until an alarm is given. An assistant may aid in rapidly aiming the gun for exact registry by watching the position of the cross in the mask (Fig. 10) relative to the cross in the control band. If he then wishes to show the distance to the target he can leave the gun pointed and turn the picture film forward, counting frames as he turns, until the target coincides with the aim spot. This gives students good judgment of distance, timing and aim for any particular type of aircraft or any other target.

The screen may be coated with phosphorescent material and a suitable light beam used to leave a track of the aim light spot on the screen which may be followed with reference to the projected image of the target. If the spot beam is interrupted periodically it will leave a series of spaced spots which progressively fade out. This is readily done by connecting the aim lamp into the trigger switch circuit.

When the control band is provided with the light apertures 55 it may be convenient to form all of them by a device of unchanging size, in which case they will all be the same size, as shown in Fig. 4. This, however, does not necessarily agree with the actual situation or most preferred practice. It may be desirable to provide hit apertures of different or variable size. For example, if the airplane is approaching, the target area in which a vital hit may be made increases in size, as shown at 55' in Fig. 5. It is desirable to take this into consideration, and this may be done by providing apertures of increasing size. It may also be desirable to diminish the accuracy required of beginners, and this may be done by making all of the apertures in the control band larger or by increasing the projection beam, as may be done with the variable diaphragm device shown in Figs. 10, 15 and 16.

The cross with thin arms shown in Fig. 4 requires high accuracy because, unless the light beam from the mask cross substantially coincides throughout with the aperture cross in the control band, there will not be enough light transmitted to energize the photo-electric cell and furnish an indication or alarm. If there is a partial lack of correspondence in either coordinate axis, the indication will not be given.

It will be realized that a cross is very discriminating in this respect. But any suitable outline form may be used. Several of these are shown in Fig. 8. Here are shown a hollow circle or annulus, a hollow circle with an enclosed hollow cross, a hollow square, and a multiple space grating or grid with variable spaces to prevent an increase after a decrease when a similar figure is passed across it.

It is possible, though somewhat difficult, to vary the apertures by mechanical means such as punches, but by photographic or beam regulating means it is relatively easy. In the latter case the aim registering aperture is not an actual hole in the band but a transparent spot or pattern in an otherwise opaque frame. This makes duplication easy and leaves the band stronger than if it were punched.

A simple method of making variable crosses is to pass the exposure beam through an expansible cross-shaped diaphragm 87 similar to a collet chuck, as shown in Figs. 15 and 16. Here four tapered spreading elements 85 are opened or closed by a tapered sleeve 86 which by turning is moved up or down the taper.

The size may change, as shown in Fig. 5, to correspond to the apparent size of an advancing or receding target; or all crosses may be made of the same size, the size depending on the degree of accuracy required.

As shown in Fig. 10, the mask cross in the projector may be similarly formed by an expansible collet 87 to vary the area through which the light can reach the aim registering or hit aperture. This will affect the required accuracy considerably, even when the size of the aperture crosses in the band is not changed. For a relatively stable condition, similar results may be obtained by varying the intensity of the projection beam or the sensitivity of the receptive equipment. But for variable conditions the variable apertures in the control band are most convenient.

In Fig. 10 there is also shown one embodiment of apparatus associated with the control band gate. Here the control support 35 is shown to be mounted in the guides of a second slide 89 which moves upon vertical retaining guides of a fixed member 90. The cables 39 for elevation and the cables 40 for train are also indicated. Amplitude changing arms 91 may be provided, these having suitable links 91A connecting them to the slides. It will be seen that an annular rotating shutter 92 is here used instead of a commutator switch shown in Fig. 1, but the principle of interruption of the light beam except when the frame is halted at the gate is the same in both cases.

Having considered the apparatus for furnishing an immediate indication of a hit at the moment the gun is fired, we may now consider the apparatus shown in Fig. 2 which furnishes the delayed light spot or any other desired indication of a hit when made, or, it may be, the striking point of a projectile or a burst or explosion in the plane of the target whether a hit has been made or not.

This apparatus accommodates the time lag or delay required for the time of flight of the bullet, hence continuous or "hose firing" which was previously described is replaced by periodic firing in which the burst spot projecting mechanism is locked in position from the time of firing until the hit is or should have been made.

Here, as before, we find the projector 20, screen 21, picture film band 22, dummy gun 25, its horizontal shafts 26, its support 27, its vertical shaft 28, its sights 30, trigger 31, trigger switch 32, control film band 36, supply reel 47, take-up reel 48, intermittent 49, Geneva shaft 50, drive motor M, motor shaft 52, sprocket chains 51 and 53, exciter lamp 57', collimating lens 58', photo electric cell 56', energizing connections 61' of the exciter lamp and leads 62' from cell 56' to control box 66'.

In addition, the gun is provided with means for directing a beam of light to form a burst spot 95 on the screen. Such means may comprise a lamp 96 and a lens 97. For simplicity these means are shown in Fig. 2 as being mounted directly in the gun, whereas preferably they are mounted on a support which is movable relative to the gun, as shown in Figs. 11 and 12.

Inasmuch as the burst spot projector 25 is to be left in a fixed position relative to the screen from the time the trigger is pulled until the burst appears, the burst spot projecting means will be locked in position during the time of flight of the bullet or for any such time as might be desired. Or, as shown, the spot may be projected at the time the hit is made and left for such additional time as desired.

The means for locking the support for the spot projecting means (here shown as being the gun) in position comprises brakes associated with the gun shafts. The horizontal shaft 26 is provided with a brake band 100, connected to a toggle 101, a solenoid 102 acting when energized to tighten the brake band and a spring 103 tending constantly to release the brake band. By leads 104 the solenoid 102 is connected into a power circuit to be energized when the trigger switch 32 is closed. This brake mechanism is mounted on the support 27.

Similarly the vertical shaft 28 is provided with a brake band 110, a toggle 111, a solenoid 112, a spring 113, and leads 114 for energizing the solenoid when the trigger switch is closed.

By any suitable lock circuit, including the leads 115 to the control box 66', the solenoids may be held in braking position for any desired period and then released.

Means are provided for timing the period of projectile flight after the shot is fired. This period is correctly provided for on each frame in any sequence, hence is also associated with the control band 36—or a separate control band if desired. Such a separate band is shown in Fig. 6, and a composite band with two indicia is shown in Fig. 7.

This control band 36, Figs. 2, 6 and 7, is provided with light apertures 120 for each frame, the apertures, as before, being either punched or made photographically. They may be rectangular instead of cross-shaped, as were the apertures 55. Instead of being located on two coordinates in a given frame area, as were the crosses 55 shown in Figs. 4 and 5, the apertures 120 are all located in a single transverse band outside that area. They are disposed at different distances from a given marginal line near one edge of the control band, and this distance determines the period of delay between fire and burst, that is, the time of flight.

It may be assumed, in approximate relationship to actual conditions, that the longest effective shot may be taken to have a time of flight of 1 second or 16 frames of motion of the picture and control bands. A given transverse distance across the control band may then represent 1 second, and when this distance is divided into sixteen parts, each part represents a period of 1/16 of a second.

A scanning plate 121, provided with a light aperture 122 is arranged to travel at a predetermined speed across the control band. For a simple case its speed may be taken as constant. Its speed may be such, for example, that its aperture traverses the horizontal band in which the apertures 120 are formed in one second, and when the aperture 122 coincides with the aperture 120 for any particular frame, a portion of the light beam from the lamp 57' and lens 58' passes through to the photo-electric cell 56' and initiates the action of the control apparatus in the control box 66'. This will control the circuit 123 of the burst spot projecting lamp 96, the solenoid lock circuit 115, and any other desired circuits. Means in the control box 66', or the relative sizes of the apertures 120 and 122, may determine how long the burst spot 95 will be maintained after the burst indication is initiated.

Means are provided for actuating the scanner plate 121 in the desired manner. Such means may, as shown, comprise a spring 124 tending to hold the plate in one direction and a cord or cable 125 adapted to move the plate at times at a constant rate in the other direction. The plate moves easily along horizontal guides shown in Fig. 10.

The cord 125 is wound on a drum 126 secured to a magnetic or friction drive disk 127, which is placed near a mating disk 128 of a constant speed drive motor M1, which rotates continuously. The drum 126 and its drive disk 127 are free to rotate and move vertically in fixed bearings for their shaft 129. Normally they are held up by a spring 130 but are moved downward to bring the disks 127, 128 into positive driving engagement by a solenoid 131 when the trigger switch 32 is closed. The circuit 132 of the solenoid is controlled jointly by the trigger switch and the lock circuit 115 from the control box 66', whereby the solenoid, once energized by the trigger switch, is maintained in action until the scanner aperture 122 coincides with an aperture 120 to provide the delayed burst indication, and for as much longer as may be provided for.

The control of the scanner movements as well as other actions or indications may be assisted by limit circuits associated with the scanner, these including limit contacts 135 and 136 (which may be adjustable if desired), a lead 137 to the scanner plate, and leads 138 and 139 to the contacts 135 and 136 respectively. The leads may be connected through the control box 66 for the desired actions.

In the operation of the burst projecting apparatus of Fig. 2, the gun or light spot projecting means is locked up the moment the trigger switch 32 is closed. The scanner plate 121 is also started moving across the control band at constant speed. When the scanner has travelled across until its aperture 122 coincides with the aperture 120 in the control band, the burst indication is given. This may be the energization of the leads 123 of the lamp 96 to project a burst spot 95 on the screen. After the predetermined lapse of time the lamp is de-energized and the spot projector or gun is taken from under the locking action of the brake solenoids 102 and 112. The aiming and firing actions may then be repeated.

Usually it will be desirable to leave the gun free for following the target at all times. To provide for this, as shown in Figs. 11 and 12, the spot projector support 142 is mounted adjacent, and in this case within, the gun 25. The spot projecting lamp 96 and lens 97 are mounted on this support and the gun has an end opening large enough to permit the relative angular movement without obstructing the spot. The essential of the gun is its sights, hence its physical construction otherwise may be varied as much as desired.

The horizontal shaft brake 100 and its solenoid 102 are now mounted on the support fork 27N and the vertical shaft brake 110 and its solenoid 112 are mounted on a part 25A which is fixed in position.

Opposed springs 143 or other suitable means cause the spot projector to return to a normal vertical position relative to the gun, and another pair of opposed springs 144 or other suitable means causes the support to return to a normal horizontal position relative to the gun when released from the brakes.

There may be a plurality of burst projectors and scanners associated with one gun to speed up the practice.

In Fig. 6 a length of control band 36 with the apertures 120 is shown. The time of flight, as before, is assumed to be ½ or 8/16 second and to remain constant because a situation has been assumed in which the target airplane flies parallel to the focal plane and remains at one given range. Therefore, since the width in the range across the band is taken as representing one second, the apertures 120 will all be at the vertical center of the band, that is 8/16 from the starting or left edge, as shown.

The composite band 36, which carries both the aim registering apertures or crosses 55 and the burst projecting apertures 120, is shown in Fig. 7. Here the cross-shaped aim registering apertures 55 are progressively spaced across the band along the length, as in Fig. 4, while the rectangular burst projecting apertures remain at the center, as in Fig. 6.

To avoid an indication except when a frame is halted, a switch 67', 68' (Fig. 2) or the equivalent in a shutter 92' (Fig. 10) may be provided as before.

The method of forming the apertures 120 is very simple. Having made a tabulation of time of flight for each sequence of picture frames, the corresponding frame of the control band is punched, or otherwise provided with the transparent area at the proper distance from the initial edge of the horizontal zone allotted for such apertures.

The aperture 120 may conveniently be punched by the apparatus shown in Fig. 17. Here the band 36 is fed by a sprocket 145 provided with a frame counter 146. A punch 147 is carried by a slide 148 and to the slide 148 there is secured a proportional lever 149 which moves over an enlarged scale 150. In this case the scale is divided into sixteen parts within the range of movement of the lever 149. This apparatus increases accuracy of location of the punch and keeps account of the frames being punched. If desired, the punch may be replaced by photographic means as in Figs. 10 and 14 for the aim registering apertures.

For simplicity of description it has largely been assumed that the target was near and that the projectile travelled in a straight line, in which case the burst spot would coincide with the point of aim in the gun sights. For some types of training practice, greater refinement for closer duplication of actual conditions may be required. The drop of the projectile due to gravity and the lead or lag due to windage when firing from the side of a speeding airplane and other factors may need to be taken into consideration.

This may be done simply and easily with the equipment already described by plotting and placing the aim registering apertures in accordance with the existing conditions. When the gravity drop is plotted it will be necessary for the gunner to aim above the target to score a hit. The burst spot will then incorrectly be located above the image of the target on the screen. Similarly when windage is plotted it will be necessary to train the gun sights ahead or behind the normal straight line flight position in order to score a hit. The burst spot in this case will again be incorrectly shown on the screen.

But it may be desirable to have the burst spot take into account the curvature of the projectile. This may also be desirable when a continuing indication of projectile travel is registered on a phosphorescent screen. The intermittent projection of the light spot will then simulate the effect of tracer bullets.

For less frequent indications or tracers, the apparatus described in connection with Fig. 2, which accounts for time of flight, may be used. For more frequent indications or tracers, a light spot may be more frequently projected to leave a track of closely spaced spots on the screen. In the latter case, neither the gun nor the spot projector will be locked up.

In order to place the spot relative to the target to take account of various factors, there may be provided the compensating or deviation control apparatus shown in Fig. 3.

Here, again, we find the picture projector 20, screen 21, picture film band 22, dummy gun 25, its horizontal shafts 26, its support 27, its vertical shaft 28, its sights 30 (only one is shown because parts are broken away), trigger 31, trigger switch 32, control film band 36, supply reel 47, take-up reel 48, intermittent 49, Geneva shaft 50, drive motor M, motor shaft 52, sprocket chains 51 and 53, exciter lamp 57'', collimating lens 58'', a plurality of beam concentrating lenses 58A, a plurality of corresponding photo-electric cells 56'', energizing connections 61'' of the exciter lamp, and leads 62'' from the cells 56'' to the control box 66''. Leads 123'' extend from the control box 66'' to the spot lamp 96'', the circuit including the trigger switch 32 and the commutator switch 67'', 68''. As before, a light shutter may be used instead of the commutator switch, the latter being shown for simplicity of illustration in Fig. 3.

The control band 36 is here provided with a plurality of light aperture areas 155 for each frame, which register with apertures 156 in a fixed plate 157. The size of the control apertures 155 may determine the amount of light reaching the light cells 56'' and the strength of their impulses. Instead of relying upon the relative strength of a single cell it may be desirable to use a variable number of cells with a variable number of apertures in an assigned zone in the control band for each effect. The latter arrangement may employ a progressive relay action similar to that known in telephone dialing systems and remote control of radio tuning. The simple form is selected for illustrative purposes.

The spot projector (lamp 96'' and lens 97'') is mounted on a support 142'' which is movable relative to the gun 25. It is shown to be mounted on a horizontal shaft 26'' on a shaft support 27'' which in turn is carried on a vertical shaft 28'' mounted on the gun.

The horizontal shaft 26'' is provided with an arm 26A which is pulled upward with a constant force by a spring 26B and pulled downward with a variable force by the solenoid 26C. Leads 160 extend from the solenoid 26C to the control box 66''.

The vertical shaft 28'' is provided with an arm 28A which may be operated as described above or pulled in one direction with a constant force by a spring 28B and in the opposite direction with a variable force by a solenoid 28C. A mating spring 28D opposes the spring 28B and if no other forces are applied the springs maintain the arm 28A in a central position. A solenoid 28E when energized pulls the arm 28A with a variable force against the constant force of the spring 28D. Leads 161 extend from the solenoid 28C to the control box 66'' and, similarly, leads 162 extend from the solenoid 28E to the control box.

In the operation of the apparatus shown in Fig. 3, the strength of light impulses transmitted by the cells 56'' will determine the amount of pull on the solenoids 26C, 28C and 28E and the amount of deviation of the spot beam. When a progressive relay action is employed, the number of light impulses transmitted will then determine the amount of deviation of the spot beam. The action is continuous from frame to frame or maintained until changed, hence the deviation is maintained or varied without permitting the spot projector support to return to the central or zero position except when it is authorized to do so.

When the control band of Fig. 9 is used, one transverse control zone is provided with a plurality of aperture areas 155. These are in addition to the aim registering apertures 55 in one control zone and the lag apertures 120 in another control zone. The apertures 155 might, of course, be provided in a separate control band, as shown in Fig. 3, but Fig. 9 illustrates how a plurality of control zones may be grouped on a single control band, and the apparatus shown in Fig. 10 for two zones together with the showing of Fig. 3 will readily indicate how apparatus for more than two zones may be built.

The apertures 155 each have a fixed position for a given function and each, when present on any frame, registers with a corresponding aperture 156 in aperture plate 157. Positions for six apertures are illustrated in Fig. 9, but for simplicity only three apertures are shown in Fig. 3.

The legends on Fig. 9 indicate how these controls are employed where their action is cumulative. The legend "1 right" means that a ratchet allotted to move a ratchet disk to the right will operate once to move the disk one unit space. The disk is held in any given position by any suitable means as, for example, by light detent or by friction means, and this holding force is relieved by any suitable means such as by a magnet actuated by the "all clear" aperture to permit the disk to return to a given zero position, as by the influence of a spring or springs. Similarly the "1 left" aperture would cause the disk to move one space to the left from whatever position it might be occupying when the impulse was given.

Fig. 18 shows how one disk may be actuated as just described. The ratchet disk is represented by the numeral 170. The disk in assembly is shown in Figs. 11 and 12. A similar disk 171 for vertical movement is also shown in Figs. 11 and 12. Magnet 172, when energized, moves the disk one space to the right and magnet 173 moves it one space to the left. A magnet 174 may be employed to release the detent when an "all clear" aperture in the control band comes into its corresponding light beam at the aperture plate. A spring or springs 175 or other suitable means may be employed for bringing the disk to a given zero position when released from the detent. The ratchet mechanisms will, of course, move clear of the disk after each actuation.

The ratchet disk 171, shown in Figs. 11 and 12, may be similarly controlled by the "1 up," "1 down" and "all clear" apertures of the control band.

An unused space designated as "reserve" is shown in the third zone 155 in Fig. 9, but this may be employed for any desired effect or influence. It will also be understood that a different number of aperture spaces may be allocated as desired. That illustrated is merely representative for the present equipment.

The method and apparatus just described permit the gun to be aimed off the target and the deviation correction provided insures that the spot will fall on the target if the aim is correct. The reverse condition may be arranged wherein the gun is aimed at the target and the spot falls off the target where the aim should be. In this case the controls act in reverse of their normal action. This use is particularly valuable for instruction; whereas the normal operation is more suitable for practice.

It has been explained how the punching device of Fig. 14 may be substituted for the light diaphragm device 87 on the coordinately moving plate 35 in the Fig. 10 assembly. For easy operation to avoid moving the punch P out of its correct position when punching the film band, the movable portion 178 of a bellows device 179 may carry the punch P and the bellows may be operated by a fluid compression bulb 180, a flexible tube 181 connecting the bulb to the bellows.

The mechanism shown in Figs. 11 and 12 is capable of performing several functions. It has been partially described but it will be helpful to summarize the description and explain the details. It combines the locking functions of Fig. 2 with the spot influencing functions of Fig. 3, and, of course, the gun may be aimed and will move the slide as in Fig. 1.

It can be seen how the gun 25 is mounted on horizontal shafts 26 carried by a fork support 27 which is attached to a vertical shaft 28. The cables 40 for transmitting horizontal movement to the control mount or slide 35 are secured to a grooved pulley 40A fast on the shaft 28. The cables 39 for transmitting vertical movement to the control mount or slide 35 are secured to a grooved pulley 39A fast on the gun concentric with the shaft 26.

In this arrangement the shaft 28 is hollow and the cables 39 pass through it to the pulley 39A which is within the gun. This makes a neat and convenient disposition of the cables and avoids entanglement with related parts.

The fixed support 25A is disposed within the gun 25, being carried on a bent neck 184 which passes through an enlarged elongated arcuate opening 185 or a notch in the bottom of the gun which permits ample turning and tilting movements of the gun. The bent neck 184 is secured to a fixed pedestal 186 surrounding and supporting the shaft 28.

Instead of mounting the spot projector (96, 97) directly in the gun, as in Fig. 2, or mounting the projector support (142″) directly in the gun, as in Fig. 3, the spot projector support 142 is so mounted in Figs. 11 and 12 as to combine the functions of the other illustrations, it being again noted that while the forms of Figs. 2 and 3 may have independent uses they may be regarded as parts of the comprehensive system.

Referring back to Figs. 11 and 12, the spot projector support 142 is provided with aligned horizontal shafts 26M which are mounted in a yoke or fork 27M having a vertical shaft 28M.

The shaft 28″ is turnably mounted in an intermediate support 189 provided with aligned horizontal shafts 26N which are mounted in a yoke or fork 27N having a vertical shaft 28N turnably mounted in the fixed support 25A.

The mechanisms of Fig. 18 for moving the spot projector support 142 relative to the yoke 27M and for moving the yoke 27M relative to the intermediate support 189 and returning both to zero positions are indicated in Figs. 11 and 12. Likewise the mechanisms similar to those of Fig. 2 for locking the intermediate support 189 to the yoke 27N and locking the yoke 27N relative to the fixed support 25A are indicated in Figs. 11 and 12. This arrangement permits the gun to continue aiming movements while the spot projector is held in position until the target image moves toward the burst spot.

Normally this intermediate support has a fixed or zero position relative to the gun, and when it is released from the fixed support 25A it is returned to its zero position by springs 143 and 144, as previously described. When the intermediate support occupies a zero position, the spot projector is influenced relative to the gun just as it would be in Fig. 3, and it may maintain the adjusted position relative to the intermediate support when that is locked in position. And it may still maintain its adjusted position after the intermediate support is returned to its zero position relative to the gun. The spot may be continuously projected, as when a phosphorescent screen is employed, or it may be delayed, as disclosed in connection with Fig. 2, or it may be projected at any time at the will of the operator or an instructor.

It will now be seen that the invention provides simple and effective apparatus for instructing and training gunners. And while certain embodiments have been specifically illustrated and described, it is to be understood that the invention may have various embodiments within the limits of the prior art and the scope of the subjoined claims.

We claim:

1. Gunnery training apparatus comprising in combination, a screen, a picture projector for directing a target image on the screen, a dummy gun mounted for coordinate vertical and horizontal movement so as to be aimed toward the target image on the screen, position means mounted for controlled movement and controlled by the position of said dummy gun, index means having characteristics corresponding to and established in accordance with factors affecting the flight of a projectile from the gun to the target and the features of the target image, and means influenced jointly by said position means and said index means for furnishing an indication of a hit or miss.

2. Gunnery training apparatus comprising in combination, a screen, a motion picture projector for directing a target image on the screen, a dummy gun mounted for coordinate vertical and horizontal movement so as to be aimed toward the target image on the screen, position means mounted for controlled movement and controlled by the position of said dummy gun, index means on a moving band kept in synchronism with said projector, said index means having characteristics corresponding to and established in accordance with factors affecting the flight of a projectile from the gun to the target and the features of the target image, and means influenced jointly by said position means and said index means for furnishing an indication of a hit or miss.

3. Gunnery training apparatus comprising in combination, a screen, a picture projector for directing motion pictures of a target image on the screen, a dummy gun mounted for coordinate vertical and horizontal movement so as to be aimed toward the target image on the screen, a band synchronized in operation with the projector, said band carrying indicia having a relative position with respect to the picture image of the target in the projector which takes account of factors affecting the flight of a projectile from the gun to the target, position means mounted for controlled movement and controlled by the position of the gun, and means jointly influenced by said position means and the indicia on the band for furnishing an immediate indication of a hit or miss when the gun is fired.

4. Gunnery training apparatus comprising in combination, a screen, a picture projector for directing motion pictures of a target image on the screen, a dummy gun mounted for coordinate vertical and horizontal movement so as to be aimed toward the target image on the screen, a band synchronized in operation with the projector, said band carrying indicia having a relative position with respect to the picture image of the target in the projector which takes account of factors affecting the flight of a projectile from the gun to the target, position means mounted for controlled movement and controlled by the position of the gun, and means jointly influenced by said position means and the indicia on the band for furnishing a delayed indication of a hit or miss when the gun is fired.

5. Gunnery training apparatus comprising in combination, a screen, a picture projector for directing a target image on the screen, a dummy gun mounted for coordinate vertical and horizontal movement so as to be directed toward the target image on the screen, position means mounted for controlled movement and controlled by the position of the gun, index means provided with positional indicia which is offset in position by an amount to take into account the time of flight of a projectile from the gun to the target, and means influenced jointly by said position means and said index means for furnishing an indication of a hit or miss when the gun is fired.

6. Gunnery training apparatus comprising in combination, a screen, a picture projector for continuously projecting motion pictures of a target image on the screen, a control band synchronized in operation with the picture film band for continuous movement, a dummy gun mounted for coordinate vertical and horizontal movement so as to be aimed toward the target image on the screen, a moving mount disposed adjacent the control band, means for transmitting gun movements to said mount, indicia on said control band having a predetermined positional relationship with respect to the image of the target in the projector, and means jointly controlled by the position of said mount and the position of the indicia in the control band for furnishing an indication of a hit or miss when the gun is fired.

7. Gunnery training apparatus comprising in combination, a screen, a picture projector, a dummy gun mounted for coordinate vertical and horizontal movement, a control band synchronized with said projector, said control band having light apertures with predetermined characteristics provided in accordance with factors of the target and projectile movement, and means controlled in part by said apertures and in part by the operation of said gun for furnishing control indications of the operation of said gun.

8. Gunnery training apparatus comprising in combination, a screen, a picture projector, a dummy gun mounted for coordinate vertical and horizontal movement, a film band in said projector for directing a sequence of pictures of a target in motion on said screen, a control band synchronized with said film band, said control band having light apertures corresponding to target positions but displaced forward in effect by the number of frames the picture film moves during the time of projectile flight, and means jointly responsive to the positions of the gun and the light apertures in the control band for furnishing an immediate indication of a hit or miss when the gun is fired.

9. Gunnery training apparatus comprising in combination, a screen, a picture projector, a dummy gun mounted for coordinate vertical and horizontal movement, a film band in said projector for directing a sequence of pictures of a target in motion on said screen, a control band synchronized with said film band, said control band having light apertures which are displaced from a given zero position by an amount of lag equal to the time of flight of the projectile, and means for furnishing an indication of a hit or miss at the end of the time of flight after the gun is fired, said means being under the joint control of the apertures in the band and of a timing element which is started into operation when the gun is fired.

10. Gunnery training apparatus comprising in combination, a screen, a picture projector, a dummy gun mounted for coordinate vertical and horizontal movement, a light spot projector mounted in association with said gun for indicating a hit on the screen, a control band synchronized with the movement of said picture projector, said control band having light apertures which are displaced from a given zero position by a distance which corresponds to the time of flight of the projectile, a scanning plate movable at a predetermined speed across the control band and provided with an aperture adapted to register with the aperture in the control band, means for locking said light spot projector in position and starting said scanning plate into movement when the gun is fired, and means for energizing the spot projector to project a light spot on the screen when the scanning plate aperture registers with the aperture in the control band.

11. Gunnery training apparatus comprising in combination, a screen, a dummy gun mounted for coordinate vertical and horizontal movement, a light spot projector mounted in association with said gun for indicating a hit on the screen, a picture projector, a film band in said picture projector for directing a sequence of pictures of a target in motion on said screen, a control band synchronized with the movement of said projector, said control band having lag indicia which are displaced from a given zero position by a distance which corresponds to the time of flight of the projectile, a scanning plate movable at a predetermined speed across the control band and provided with indicia adapted to register with the indicia in the control band, means for locking said light spot projector in position and starting said scanning plate into movement when the gun is fired, the picture and control bands continuing in motion, and means for energizing the spot projector to project a light spot on the screen when the scanning plate indicia registers with the indicia in the control band, the spot falling fairly on the target if the gun was properly aimed to make a hit.

12. Gunnery training apparatus comprising in combination, a screen, a picture projector for continuously projecting motion pictures on the screen, a dummy gun mounted for coordinate vertical and horizontal movement for aiming and firing at a target image on said screen, a moving band synchronized with the projector operation having indicia related to the target and projectile flight, a light spot projector mounted with said gun and movable therewith, the spot projector mounting also permitting movement of the projector relative to the gun, and means controlled by indicia on said band for influencing the position of the spot projector relative to the gun.

13. Gunnery training apparatus comprising in combination, a screen, a picture projector, a dummy gun mounted for coordinate vertical and horizontal movement, a light spot projector mounted with said gun and movable therewith, the spot projector mounting also permitting movement of the spot projector relative to the gun, and means for temporarily locking the spot projector in position at times, the gun being free to continue its movements at all times.

14. Gunnery training apparatus comprising in combination, a screen, a picture projector, a dummy gun mounted for coordinate vertical and horizontal movement, a light spot projector mounted in association with the gun and affected by the gun movement so as normally to follow the movements of said gun, said spot projector mounting also providing movement of the spot projector relative to the gun position, and means for producing movement of said spot projector relative to the gun movement.

15. Gunnery training apparatus comprising in combination, a screen, a picture projector, a dummy gun mounted for coordinate vertical and horizontal movement, a light spot projector mounted in association with the gun and affected by the gun movements so as normally to follow the movements of said gun, said spot projector mounting also providing movement of the spot projector relative to the gun position, and means for producing movement of said spot projector relative to the gun movement, said means acting only for a limited time and said spot projector returning to normal movement with the gun when the action of said means is not exerted.

16. Gunnery training apparatus comprising in combination, a screen, a picture projector for continuously projecting motion pictures on the screen, a dummy gun mounted for coordinate vertical and horizontal movement for aiming and firing at a target image on said screen, a moving band synchronized with the projector operation having indicia related to certain factors of aiming and firing, a light spot projector mounted to move with said gun and to have movement relative to the gun movement, and means affected by the indicia on said band for biasing said spot projector away from its normal position relative to the gun while permitting it to continue in movement with the gun.

17. Gunnery training apparatus comprising in combination, a screen, a picture projector for directing a target image on the screen, a dummy gun mounted adjacent the projection axis to have coordinate vertical and horizontal movement so as to be aimed toward the target image on the screen, a control frame, means to pass a beam of light to said control frame, means movable relative to said control frame and regulated in its movements by the movements of said dummy gun to alter the position of the beam of light on said frame in accordance with the position of the target on the screen, and means for making a record indication of the position of the beam of light relative to said frame when the dummy gun is in a fixed position of aim relative to the target on the screen.

18. Gunnery training apparatus as set forth in claim 17 further characterized by the fact that said projector includes a projecting strip having a plurality of image projecting frames and that a control strip is provided which has a plurality of corresponding control frames, and means for moving said control strip in a controlled relationship to the movements of said projecting strip.

19. The method of providing gunnery training which comprises, making a picture of the target on one or more projection frames from the gunner's position, projecting an image of the target from the frame upon a screen, aiming a dummy gun which is mounted for coordinate movement near the center of projection at the image on the screen, firing the gun when so aimed, and placing control indicia on a control frame in a position determined in part at least by the position of said dummy gun at the time of fire.

20. The method as set forth in claim 19 which further comprises, determining the distance of the target from the gun and the factors of projectile flight relative to the target, and placing the control indicia on the control frame to take into account these flight factors in addition to the factor of the gun position.

21. The method of providing gunnery training which comprises, making a record on a motion picture projection band of the target from the gunner's position, projecting the target image on a screen frame by frame, aiming and firing a dummy gun from the gunner's position at the image on the screen for a frame, moving a control band frame by frame in coordination with the projection band movements, and placing a light aperture in a corresponding frame of the control band in part at least in accordance with the aimed position of the dummy gun at the time of fire.

22. The method as set forth in claim 21 which further comprises, determining the time factor of projectile flight from the gun to the target, displacing the control band relative to the projection band by a number of frames to account for the time of flight, and placing the aperture on the control frame at the displaced position.

23. The method as set forth in claim 21 which further comprises, determining the size of the target and its distance from the gunner's position and altering the aperture in the control band to accommodate for projectile dispersion for these factors.

24. The method as set forth in claim 21 which further comprises, again projecting the target image on the screen from the motion picture band while operating the control band synchronously in its non-displaced relationship, aiming and firing a dummy gun for the target from the gunner's position, and furnishing an indication of a hit or miss from the control band when the gun is fired.

25. The method of providing gunnery training which comprises, making a picture of the target on a target image projecting medium or picture frame from the gunner's position, placing on a control medium indicia which correctly represent the proper gun aim position after providing for flight factors of the target and projectile for the coordinate and distance position of the target represented by its image on said frame, projecting the target image on a screen, aiming and firing at the target image on the screen with a movable dummy gun held at the position adjacent the image projection axis for which the control indicia were prepared, and furnshing an indication of a hit or miss in accordance with the position and time of fire of the gun relative to the disposition of the indicia on the control medium when the gun is fired.

26. The method of providing gunnery training which comprises, making a sequence of motion pictures of the target from the gunner's position, placing on a control band indicia which correctly represent the proper gun aim position after providing for flight factors of the target and projectile for the coordinate and distance position of the target for each frame in which the target is in the range of the gun, projecting the sequence of pictures of the target continuously on a screen while simultaneously and correspondingly advancing said control band frame by frame, aiming and firing at the target image on the screen with a movable dummy gun held at the position adjacent the image projection axis for which the indicia on the control band were prepared, and furnishing an indication of a hit or miss in accordance with the position and time of fire of the gun relative to the disposition of the indicia on the control band when the gun is fired.

27. The method of providing gunnery training which comprises, making a sequence of motion pictures of the target from the gunner's position, preparing a table correctly representing the time of flight of a projectile to the target for each frame of the picture band wherein it is desired to fire upon the target, placing the motion picture band and a corresponding control band of commensurate length and number of frames at a matched starting point, projecting an image of the target on a screen, aiming a movable dummy gun at the target on the screen from a position closely adjacent the point of image projection, displacing the control band relative to the picture band by a number of frames representing the time of flight of the projectile to the target, placing indicia of the target position after the time of flight of the projectile on the control band, returning the control band to matched position with the film band for projection, projecting pictures of the target on the screen, firing the dummy gun at the target, and furnishing an indication of a hit or miss in accordance with the mutual control of the indicia on the control band and the position and time of fire of the gun.

28. The method of providing gunnery training which comprises, making a sequence of motion pictures of the target from the gunner's position, preparing a table correctly representing the time of flight of a projectile to the target for each frame of the picture band wherein it is desired to fire upon the target, placing time lag compensating indicia on control frames to represent the position of the target after the time of flight, projecting images of the target frame-by-frame while advancing the time lag compensating indicia correspondingly frame by frame, firing a movable dummy gun at the target from a position closely adjacent the point of image projection, and providing an indication of a hit or miss in accordance with the position of the gun relative to the indicia on the allocated control frame.

29. The method as set forth in claim 26 which further comprises providing different indicia for different effects in different allocated zones of each frame of the control band, and furnishing the indication by the simultaneous effect of a plurality of indicia on a frame.

30. Gunnery training apparatus comprising in combination, a dummy gun mounted for movement about horizontal and vertical axes, an intermediate support mounted for movement about horizontal and vertical axes on the gun, and a spot projector mounted for movement about horizontal and vertical axes on the intermediate support.

31. Gunnery training apparatus comprising in combination, a dummy gun mounted for movement about horizontal and vertical axes, an intermediate support mounted for movement about horizontal and vertical axes on the gun, a spot projector mounted for movement about horizontal and vertical axes on the intermediate support, a fixed support, means for locking said intermediate support to said fixed support, means for returning the intermediate support to a predetermined zero position relative to the gun when released, and means for changing the position of the spot projector relative to the intermediate support.

32. Gunnery training apparatus comprising in combination, a screen, a picture projector for projecting motion pictures of a target on the screen, control band means moving in synchronism with said projector, said control band means being provided with aim registering indicia of target positions, lag for time of flight and aim correction for projectile curvature, a dummy gun mounted for movement about horizontal and vertical axes, an index slide controlled by gun movements for registration with the target position indicia of said control band means, a trigger switch, means for giving an indication of a hit when the trigger switch is operated, a movable spot projector mounted on said gun, means for influencing the position of the spot projector relative to the gun under control of the aim correction indicia of said control band means, means for locking said spot projector in position when the trigger switch is operated, and means under the control of said lag indicia for projecting the spot beam and for releasing the spot projector.

33. Gunnery training apparatus comprising in combination, a screen, a picture projector for projecting motion pictures of a target on the screen, control band means moving frame by frame in synchronism with the picture film band in said projector, said control band means being provided with aim registering indicia of target positions, of lag indicia for time of projectile flight, and of aim correction indicia for projectile curvature, a dummy gun mounted for movement about horizontal and vertical axes, an index slide controlled by gun movements for registration with the target position indicia of said control band means, a trigger switch on said gun, means controlled by said slide and said aim registering indicia for giving an indication of a hit when the trigger switch is operated, an intermediate support mounted for movement about horizontal and vertical axes relative to said gun but normally constrained to move with the gun, a fixed support, means controlled by said lag indicia for locking said intermediate support in fixed position on said fixed support when the gun is fired and releasing it after a given time, a spot projector mounted for movement about horizontal and vertical axes on said intermediate support, means controlled by said aim correction indicia for moving said spot projector in increments from a zero position or for releasing it to return to zero position, and means for projecting a beam from said spot projector at times.

34. The method of providing gunnery practice which comprises, projecting motion pictures of a target on a phosphorescent screen, and firing a movable light beam projecting gun at the target on the screen thereby leaving a temporarily subsisting and gradually fading trace of imaginary projectiles on the screen to be viewed in co-relationship to the images of the advancing target.

35. The method as set forth in claim 34 which further comprises, interrupting said light beam to leave spaced spots representing bullets or tracers on the screen.

36. The method as set forth in claim 34 which further comprises, displacing the position of said light beam in accordance with flight factors of the projectile, such as gravity, windage and the like.

37. As an article of manufacture, a control band for use in connection with projected motion pictures of a target in flight, said control band having a plurality of frames which are provided with light apertures correctly related to a given factor of target and projectile flight for each sequence in which the target is to be fired upon.

38. A control band as set forth in claim 37 in which said apertures are formed as crosses placed in cross sectional areas to represent target positions after the time of flight of the projectile.

39. A control band as set forth in claim 37 in which said apertures are formed of varying size having a predetermined relationship to required accuracy of aim.

40. A control band as set forth in claim 37 in which said apertures are formed in a horizontal zone at a distance from a given zero line which correctly represents the time of flight.

41. A control band as set forth in claim 37 in which apertures of different character are provided in different zones of the frames.

42. A control band as set forth in claim 37 in which said apertures are placed in fixed assigned positions in the band for different assigned control effects.

43. As an article of manufacture, a control band for use in connection with projected motion pictures of a target in flight, said control band having a plurality of frames each of which is divided into several areas, one area of relatively large size being provided with indicia corresponding to target positions on the motion picture film frames, a second area being provided with lag indicia which take account of time of flight of a projectile fired at the target, and a third area being provided with correction indicia for factors such as gravity, windage and the like which affect projectile curvature, the indicia for each effect being allocated its own position in the third area and being located in this area when the effect is to be exerted.

44. Apparatus for providing aim registering indicia in a control band adapted to run in step with a motion picture film projection band, including in combination, a projector adapted to project images of the target on a screen frame-by-frame, means connected with the projector to move a control band frame-by-frame with the picture band and including means to cause displacement between the picture band and the control band by a desired number of frames, means for indicating the number of frames displacement, means to establish a coordinate target position on the control band by reference to the target position for a frame on the picture band, and means for placing target indicia on the control band at the selected position.

45. Apparatus for providing aim registering indicia in a control band adapted to run in step with a motion picture film projection band, including in combination, a projector adapted to project images of the target on a screen frame-by-frame, means connected with the projector to move a control band frame-by-frame with the picture band and including means to cause displacement between the picture band and the control band by a desired number of frames, means for indicating the number of frames displacement, means to establish a coordinate target position on the control band by reference to the target position for a frame on the picture band, and means for placing target indicia on the control band at the selected position, said indicia placing means including a light exposure device for forming a light aperture in a photo-sensitized band.

46. Apparatus for providing aim registering indicia in a control band adapted to run in step with a motion picture film projection band, including in combination, a projector adapted to project images of the target on a screen frame-by-frame, means connected with the projector to move a control band frame-by-frame with the picture band and including means to cause displacement between the picture band and the control band by a desired number of frames, means for indicating the number of frames displacement, means to establish a coordinate target position on the control band by reference to the target position for a frame on the picture band, and means for placing target indicia on the control band at the selected position, said indicia placing means including a light exposure diaphragm of variable opening for forming a light aperture in a photo-sensitized band.

47. Apparatus for providing aim registering indicia in a control band adapted to run in step with a motion picture film projection band, including in combination, a projector adapted to project images of the target on a screen frame-by frame, means connected with the projector to move a control band frame-by-frame with the picture band and including means to cause displacement between the picture band and the control band by a desired number of frames, means for indicating the number of frames displacement, means to establish a coordinate target position on the control band by reference to the target position for a frame on the picture band, and means for placing target indicia on the control band at the selected position, said indicia placing means including a punch for forming an aperture in the band.

48. Apparatus for providing aim registering indicia in a control band adapted to run in step with a motion picture film projection band, including in combination, a projector adapted to project images of the target on a screen frame-by-frame, means connected with the projector to move a control band frame-by-frame with the picture band and including means to cause displacement between the picture band and the control band by a desired number of frames, means for indicating the number of frames displacement, means to establish a coordinate target position on the control band by reference to the target position for a frame on the picture band, and means for placing target indicia on the control band at the selected position, said indicia placing means including a punch for forming an aperture in the band, and remote fluid actuating means for operating the punch without influencing its position.

49. Apparatus for providing lag indicia on a control band for gunnery training, comprising in combination, means to move the control band in successive units of length, a device for forming light apertures in a given strip across the band, and means for moving and holding the device in selected positions across the band.

50. Gunnery training apparatus comprising in combination, a dummy gun, a control band running at constant speed, said band having lag apertures at certain distances across its width, an aperture scanner plate adapted to move across the band, a speed control device for the scanner plate, and means for placing the plate in movement under the control of said device at selected times when the gun is fired.

51. Apparatus as set forth in claim 50 wherein said device comprises a constant speed motor and said connecting means comprises cooperating drag disks which are connected when the gun is fired.

52. Gunnery training apparatus comprising a concave screen of double curvature, a plurality of picture projectors located each on the side of the center of curvature of the screen opposite the side on which the projection area of the screen itself is located and projecting light beams through said center, and a plurality of dummy guns grouped near said center and approximately at the same distance from the screen as said center.

FRED WALLER.
WILLIS ROBERT DRESSER.
HENRY MARTYN BAKER.